United States Patent
Zaima (10) Patent No.: US 6,333,909 B1
(45) Date of Patent: Dec. 25, 2001

(54) OPTIMUM REPRODUCTION LASER POWER BASED ON AMPLITUDE LEVEL OF INFORMATION SIGNAL

(75) Inventor: Yoshie Zaima, Kagoshima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/184,133

(22) Filed: Nov. 2, 1998

(30) Foreign Application Priority Data

Nov. 4, 1997 (JP) .................................................. P9-301940

(51) Int. Cl.[7] ........................................................ G11B 7/00
(52) U.S. Cl. ................. 369/116; 369/124.01; 369/47.5; 369/53.27
(58) Field of Search ............................. 369/116, 124.01, 369/54, 59.12, 59.2, 53.37, 53.27, 47.5, 53.18, 53.36

(56) References Cited

U.S. PATENT DOCUMENTS

| | | | |
|---|---|---|---|
| 5,140,580 | * 8/1992 | Ohara et al. | 369/116 |
| 5,559,785 | * 9/1996 | Honda | 369/116 |
| 5,805,559 | * 9/1998 | Murakami et al. | 369/116 |
| 5,835,476 | * 10/1998 | Yamasaki et al. | 369/116 |

FOREIGN PATENT DOCUMENTS

| | | |
|---|---|---|
| 8102078 | 9/1994 | (JP) . |
| 8124285 | 10/1994 | (JP) . |
| 9115167 | 10/1995 | (JP) . |

* cited by examiner

*Primary Examiner*—Ali Neyzari
*Assistant Examiner*—Kim-Kwok Chu
(74) *Attorney, Agent, or Firm*—Ronald P. Kananen; Rader, Fishman & Grauer (57) ABSTRACT

An optical information reproducing apparatus and an optical information reproducing method are capable of restraining the variation of laser power by always detecting a constant amplitude of RF signal, even if there is a irregularity of asymmetry. In the optical information reproducing apparatus for reproducing an information signal recorded on a disk (8) by irradiating thereon a laser light modulated by an information signal, during reproduction, the control amount (S4) of the power control circuit 11 for controlling the power of the laser light to an optimum value is made the value based on the amplitude level VP-, VP+ of the reproduced information signal.

8 Claims, 8 Drawing Sheets

FIG. 8A  S1 RF Signal

FIG. 8B  S2 RFAC Signal

OPTIMUM REPRODUCTION LASER POWER BASED ON AMPLITUDE LEVEL OF INFORMATION SIGNAL

BACKGROUND OF THE INVENTION

1. Field of the Invention

The present invention relates to an optical information reproducing apparatus and an optical information reproducing method and is applicable to a reproducing method and a reproducing apparatus of disks such as a magneto-optical disk (MO), a compact disk (CD, CD-ROM) and a digital video disk (DVD).

2. Description of the Related Art

For example, a conventional recording apparatus for the compact disk being an optical information recording medium of this kind processes data to be recorded and then makes an EFM (Eight-to-Fourteen Modulation) on the data, thereby causing a pit sequence having periods ranging from 3T to 11T with respect to a predetermined basic period T to be formed. Thus, audio data or the like to be recorded.

Correspondingly, a compact disk player irradiates the compact disk with a laser beam and receives the returned light, thereby generating a reproduced signal which varies in the signal level dependent on an amount of the returned light and then producing a binary signal from the reproduced signal by a predetermined slice level.

Further, this binary signal drives a PLL circuit to produce a reproduced clock, by which the binary signal is sequentially latched. This reproduces data with the periods from 3T to 11T corresponding to the pit sequence framed on the compact disk to be produced.

The compact disk player decodes the thus reproduced data by the data processing corresponding to the data processing during recording and reproduces audio data or the like recorded on the compact disk.

In this context, every optical disk has different characteristics of the degree of modulation, the reflective factor and the like. For this reason, in the optical disk reproducing apparatus, there is provided a laser power control circuit having a function which prevents the deterioration of reproduced signal level by controlling the level of reproduced RF signal to be kept constant.

Figure 5:
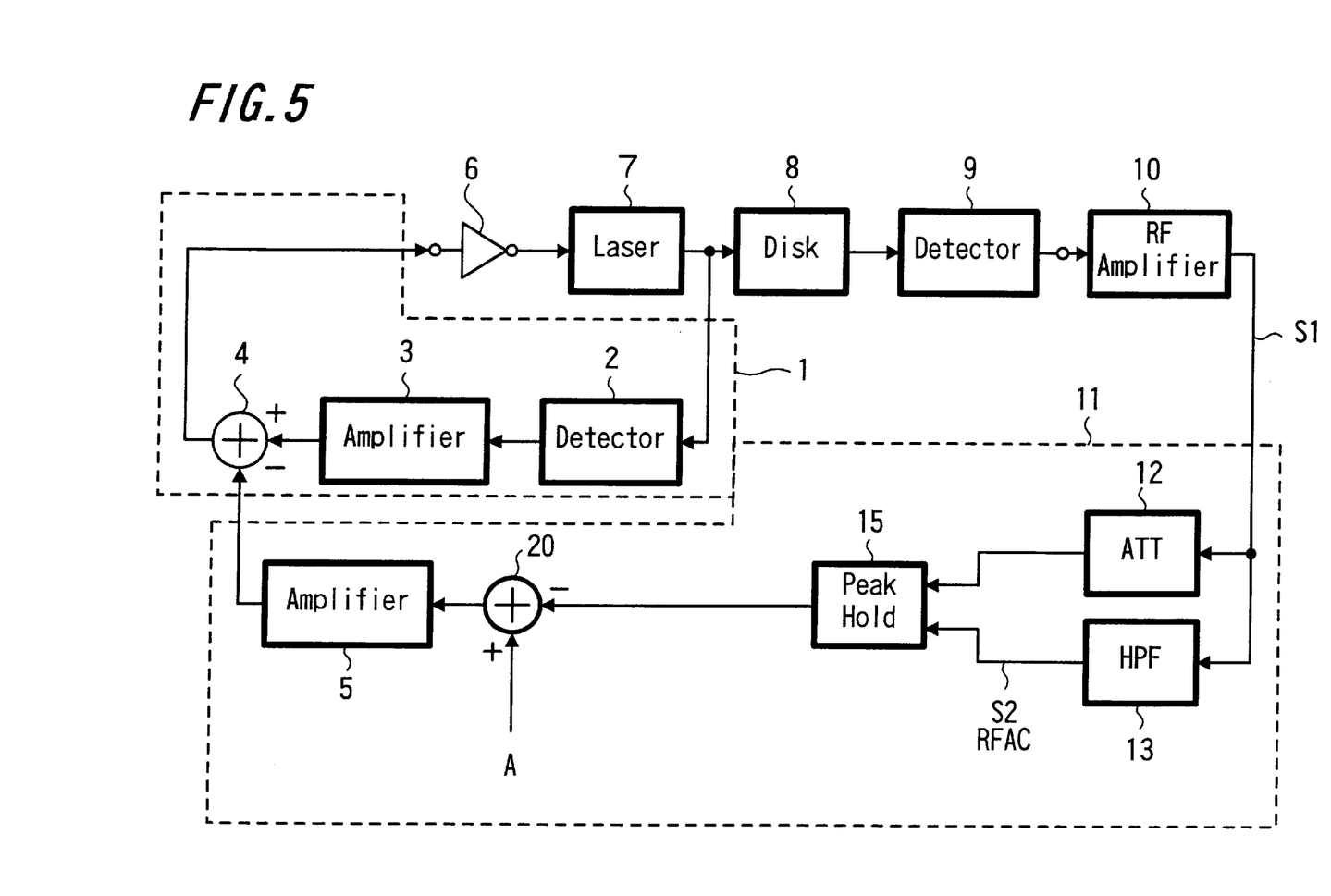
FIG. 5 is a block diagram showing the laser power control circuit of the conventional optical disk device.

FIG. 5 shows a block diagram of the laser power control circuit of a conventional optical disk device. The optical disk device to which the laser power control circuit is applied comprises an auto power control (APC) circuit 1, an invertor 6, a laser 7 emitting a laser light, a disk 8 irradiated with the laser light, a detector 9 detecting the reflected light of the laser light irradiating the disk 8, a RF amplifier 10 amplifying the reproduced signal detected by the detector 9, and a laser power control (LPC) circuit 11 detecting an amount of control for controlling the laser power.

The APC circuit 1 includes a detector 2 monitoring the irradiating light of laser 7, an amplifier 3 amplifying the monitored level by the detector 2, an adder 4 adding the monitored level amplified by the amplifier 3 and input to its adding input terminal (+) and an operating signal detected by the LPC circuit 11 and input to its subtracting input terminal (−).

The LPC circuit 11 includes an attenuator (ATT) 12 attenuating a reproduced RF signal SI amplified by the RF amplifier 10 by a predetermined level, a high pass filter (HPF) 13 passing a high frequency component of the reproduced RF signal SI, a peak hold circuit 15 detecting and holding a peak value in outputs of the ATT 12 and HPF 13, an adder 20 adding an output of the peak hold circuit 15 input to its subtracting input terminal (−) and a target level A input to its adding input terminal (+) for outputting an operating signal, and an amplifier 5 amplifying an output of the adder 2.

The thus configured laser power control circuit of the conventional optical device operates as follows. The reproduced RF signal SI detected by the detector 9 is supplied to the RF amplifier 10. The reproduced RF signal SI is amplified by the RF amplifier 10. The amplified RF signal SI is supplied to the ATT 12 and the HPF 13 of LPC circuit 11.

The RF signal S1 is attenuated by the predetermined level in the ATT 12 of LPC circuit 11. A DC (direct current component) of the RF signal is cut off to pass its high frequency component by the HPF 13. The attenuated output of ATT 12 and a high frequency output RFAC (S2) of HPF 13 are supplied to the peak hold circuit 15. The peak hold circuit 15 holds a peak value of an added version of the attenuated output ATT 12 and the high frequency output of HPF 13 for outputting. The peak output of peak hold circuit 15 is supplied to the subtracting input terminal (−) of the adder 20. The target level value A is supplied to the adding input terminal (+) of the adder 20. The adder 20 compares the peak output with the target level value A to output a difference between them as the operating signal which is amplified by the amplifier 5.

The operating signal is supplied to the subtracting input terminal (−) of the adder 4 of APC circuit 1. The irradiating light of laser is incident on the detector 2 of APC circuit 1 and the detector 2 monitors the irradiating light of laser 7. A voltage which is monitored by the detector 2 is supplied to the amplifier 3 to be amplified. The monitored voltage amplified by the amplifier 3 is supplied to the adding input terminal (+) of the adder 4. The adder 4 compares the operating signal detected by the LPC circuit 11 with the monitored voltage to output its difference (an amount of operation). A controlling output of the APC circuit 1 is supplied to the invertor 6 where it is inverted and supplied to the laser 7. The laser 7 emits the laser light based on the inverted controlling output. The laser light irradiates the surface of disk 8 and the detector 9 detects the reflected light, thereby allowing an information signal to be reproduced.

In this case, the peak value of the high frequency output RFAC (S2) of HPF 13 which passes the RF signal S1 from the RF amplifier 10 and cuts off the DC (direct current component) of RF signal S1 is the controlling signal, which is peak-held. This peak value of RFAC (S2) is compared with the level A (½× (the target value of amplitude value of the RF signal)) and its difference is impressed on the APC circuit 1 to control the laser power.

This makes the level of laser power to be restricted to an RF signal level established by the target level A. Here, the peak-held attenuated output of ATT 12 is used for detecting the amount of control. This is on purpose that even if the information signal is reproduced from the disk 8, e.g., with very low degree of modulation, the level of RF signal S1 can be ensured by detecting the operating signal from the LPC circuit 11. In other words, in case of the disk with very low degree of modulation, the amplitude of RF signal is small so that LPC circuit 11 operates to raise the laser power. Thus, a chain of ATT 12 is inserted in order that the RF signal is destroyed due to that operation.

Figure 6:
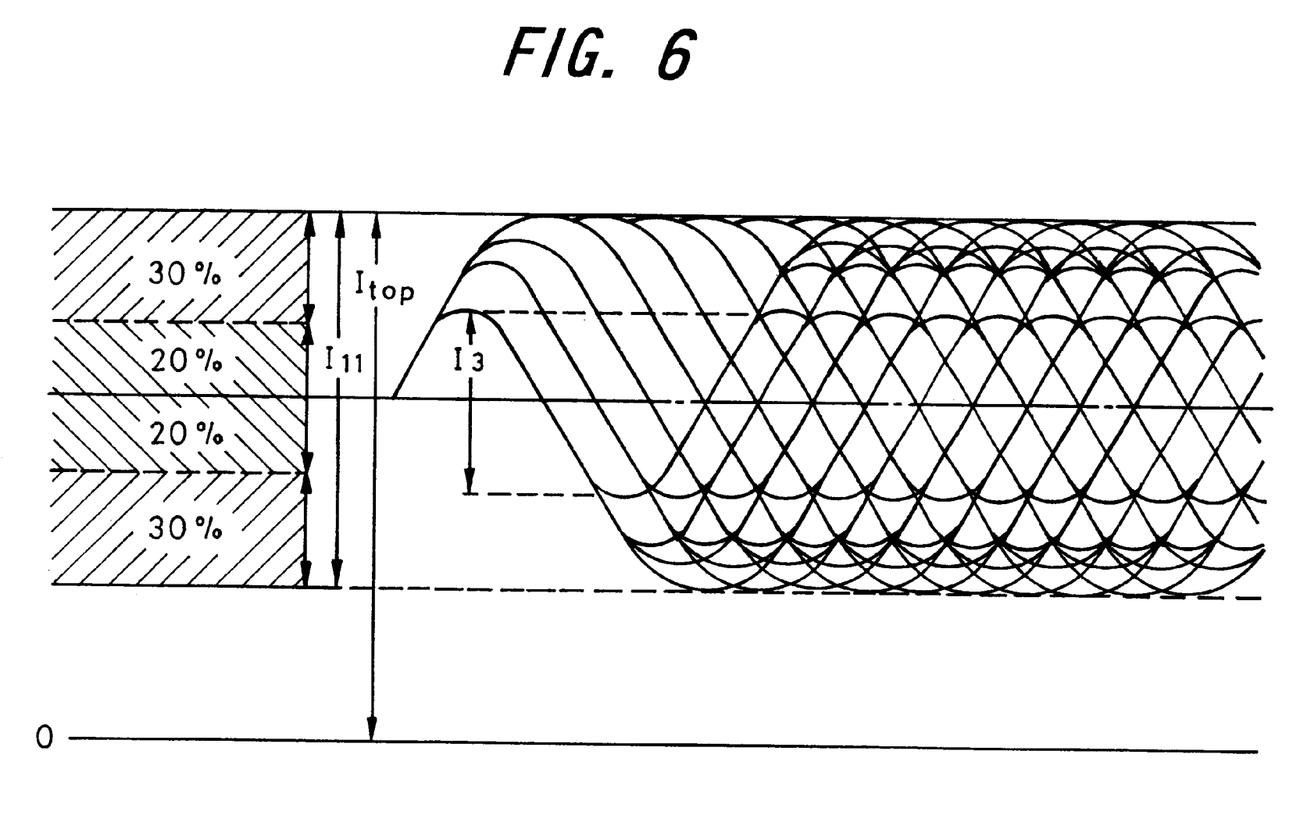
FIG. 6 is a waveform diagram used to explain the conventional asymmetry standard.
Figure 7:
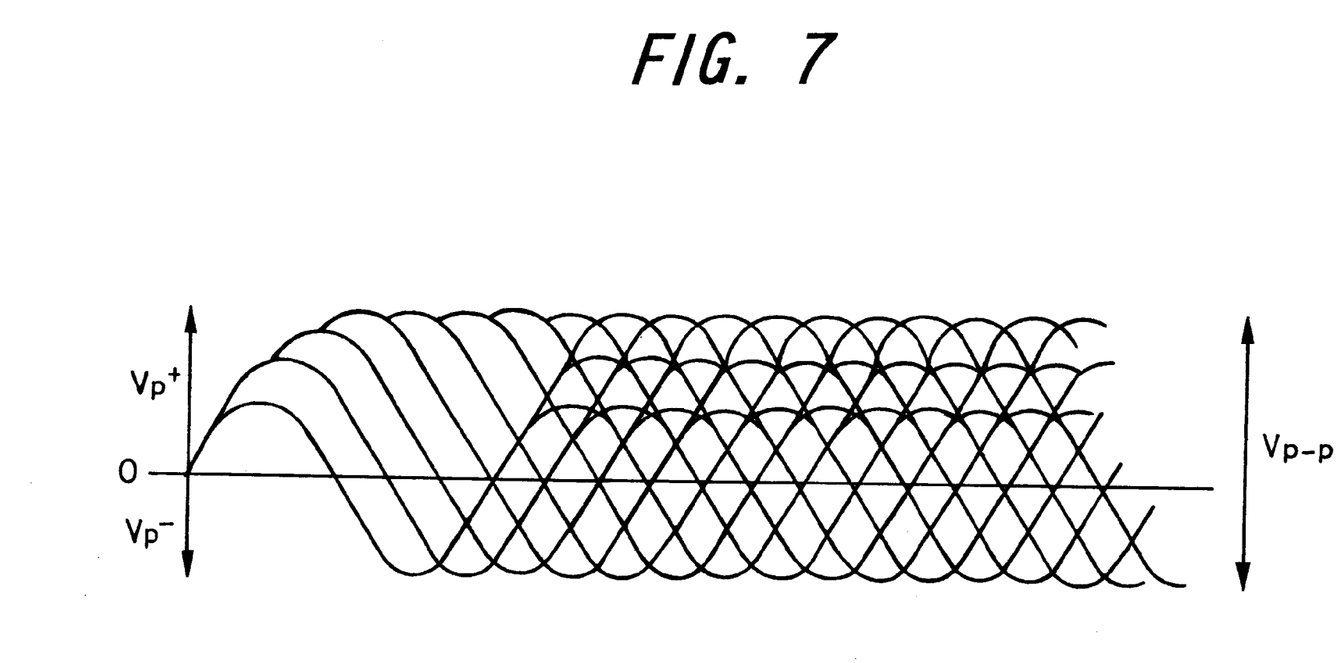
FIG. 7 is a waveform diagram showing an example of the conventional RFAC signal.

In the above described laser power control circuit of the conventional optical disk device, in order to detect the amplitude of RF signal S1, only the peak value (VP+) of the high frequency output RFAC (S2) of HPF 13 is peak held as the amount of control by the peak hold circuit 15. However, because the characteristics of degree of modulation, reflective factor, etc. are different in every disk 8, the pits on the disk 8 become slightly longer or shorter by the same amount in the longitudinal forward and backward direction and so there is an irregularity of asymmetry at every disk 8. As shown in FIG. 6, the RF signal includes signals ranging from I3 to I11 between zero level and I top, but only signals within ±20% from the center of amplitude can satisfy the asymmetry standard. Because there is the irregularity of asymmetry in this manner, even the high frequency output RFAC (S2) of HPF 13 which cuts off the DC (direct current component) of the RF signal S1 includes signals corresponding to signals having a DC offset as shown in FIG. 7.

Therefore, if only the peak value (VP+) of the high frequency output RFAC(S2) of HPF 13 is used as the amount of control, because the peak value is controlled to be the target value, the maximum amplitude VP–P of the constant RF signal S1 which is an original object of the laser power control circuit will not be available. For example, in case of FIG. 7, because there is a positive offset, the peak value VP+ will be greater than VP+>½· (VP–P). Thus, the amplitude VP–P of RF signal will be controlled to be smaller than the target level.

Figure 8A:
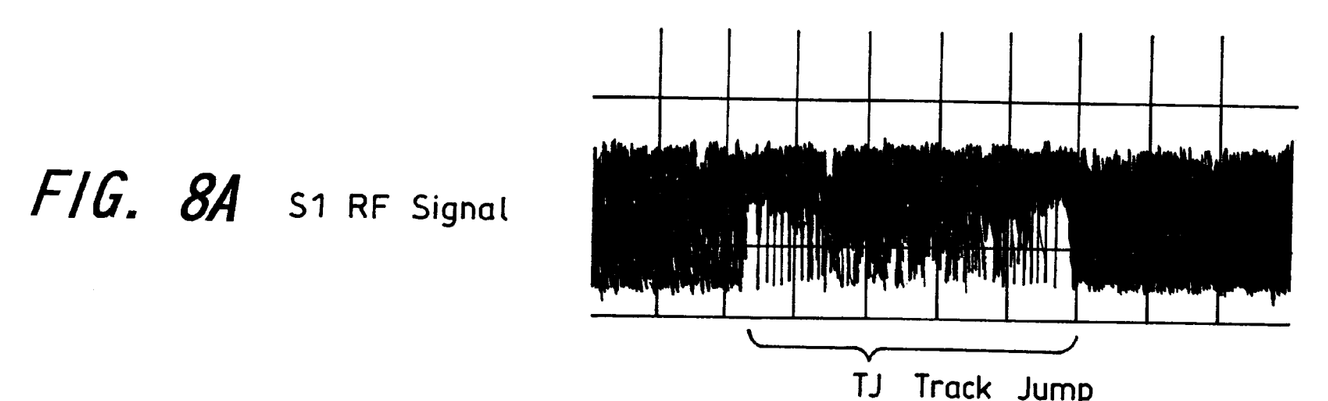
Figure 8B:
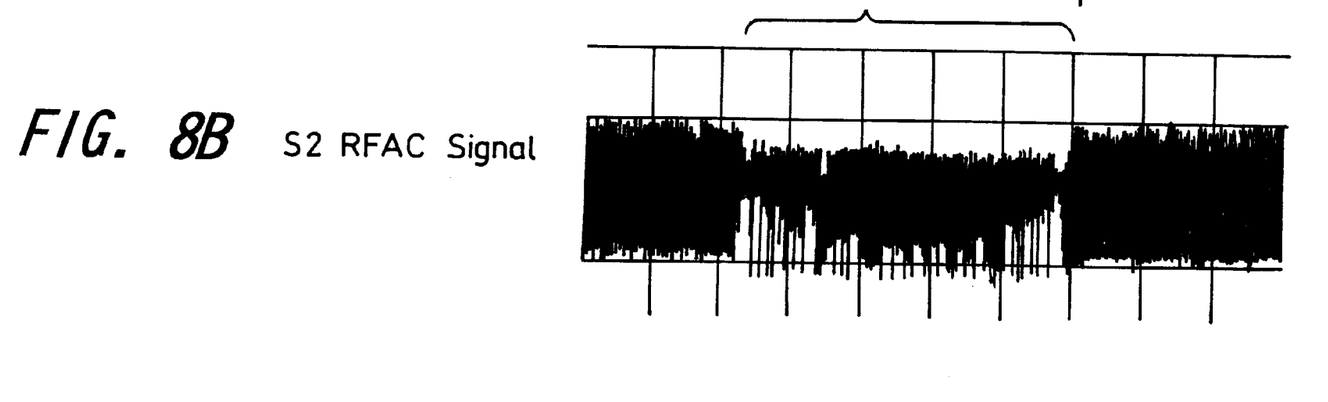

Further, in the optical disk device, when an optical pickup is moved from the inner circumference to the outer circumference (or from the outer circumference to the inner circumference) of the disk 8, for example, during the track jump TJ or sled kick, the RF signal (S1) as shown in FIG. 8A and the high frequency output RFAC (S2) of HPF 13 as shown in FIG. 8B will occur. As described above, because the peak value of the RFAC (S2) is used as the amount of control in the laser power control, the amplitude of RF signal is controlled to be greater than the target level during the movement of pickup, so that the laser power and the RF signal level will be raised in vain. This will cause an inconvenience that a life of the laser is shortened and also another inconvenience that a deviation of the gain adjustment occurs when the automatic adjustment of the servo system such as the tracking servo or the like is performed.

SUMMARY OF THE INVENTION

The present invention has been made in view of the foregoing points, and intends to propose an optical information reproducing apparatus and an optical information reproducing method which is capable of restraining a variation of the laser power by detecting the constant RF signal amplitude at all times even if there is the unevenness of asymmetry.

In order to solve such problem, the present invention provides an optical information reproducing apparatus for reproducing an information signal, which is recorded on an optical recording medium by irradiating a laser light modulated by an information signal on the optical information recording medium, wherein during reproduction the control amount of the laser power control circuit for controlling the power of laser light to be an optimum value is made a value based on an amplitude level of the information signal upon reproduction.

Also, the present invention provides an optical information reproducing method for reproducing an information signal, which is recorded on an optical recording medium by irradiating a laser light modulated by an information signal on the optical information recording medium, wherein during reproduction the control amount in the laser power control for controlling power of the laser light to be an optimum value is made a value based on an amplitude level of the information signal upon reproduction.

An operation according to the optical information reproducing apparatus and the optical information reproducing method of the present invention is as follows.

During reproduction, the laser power control circuit produces the control amount for controlling the power of the laser light to be an optimum value in reproduction. The laser power control circuit outputs as an operating signal a difference from the target level value so as to make this control amount to be a value based on an amplitude level of the information signal upon reproduction.

The laser power control circuit makes the value based on the amplitude level of information signal to be a value of the amplitude level of the reproduced high frequency signal or a DC signal proportional to the amplitude level of the reproduced high frequency signal, for outputting as the operating signal the difference from the target level value.

The laser power control circuit detects the peak value at a bottom level of the reproduced high frequency signal by peak hold, adds the bottom peak value detected by the peak hold and the reproduced high frequency signal, peak-holds the added output signal, and outputs as the operating signal the difference from the target level value so as to detect the reproduced high frequency signal or the DC signal proportional to the amplitude level of the reproduced high frequency signal.

The laser power control circuit shifts the information signal in reproduction by its bottom peak value and produces a waveform having the maximum amplitude from zero level. The laser power control circuit compares this peak value of the maximum amplitude with a target amplitude value of the information signal upon reproduction, makes its difference or the signal proportional thereto to be the amount of operation, and applies this to the laser for controlling the laser power.

The amount of operation is supplied to the laser. The laser emits the laser light according to the amount of operation. The laser light is made to irradiate the disk surface and the reflected light is detected to reproduce the information signal. This restricts the level of laser power to the level of reproduced information signal established by the target level.

In this way, by making the amplitude of information signal upon reproduction to be the amount of control in the laser power control, even if there is the irregularity in the reproduced information signal, it will be possible to always obtain a constant amplitude of the information signal upon reproduction.

BRIEF DESCRIPTION OF THE DRAWINGS

FIG. 8, having FIGS. 8A and 8B, are waveform diagrams showing examples of the conventional signals during a track jump, in which FIG. 8A shows an RF signal (S1) and FIG. 8B shows an RFAC signal (S2).

DESCRIPTION OF THE PREFERRED EMBODIMENTS

Embodiments according to the present invention will now be described below in detail with reference to the accompanying drawings.

Figure 1:
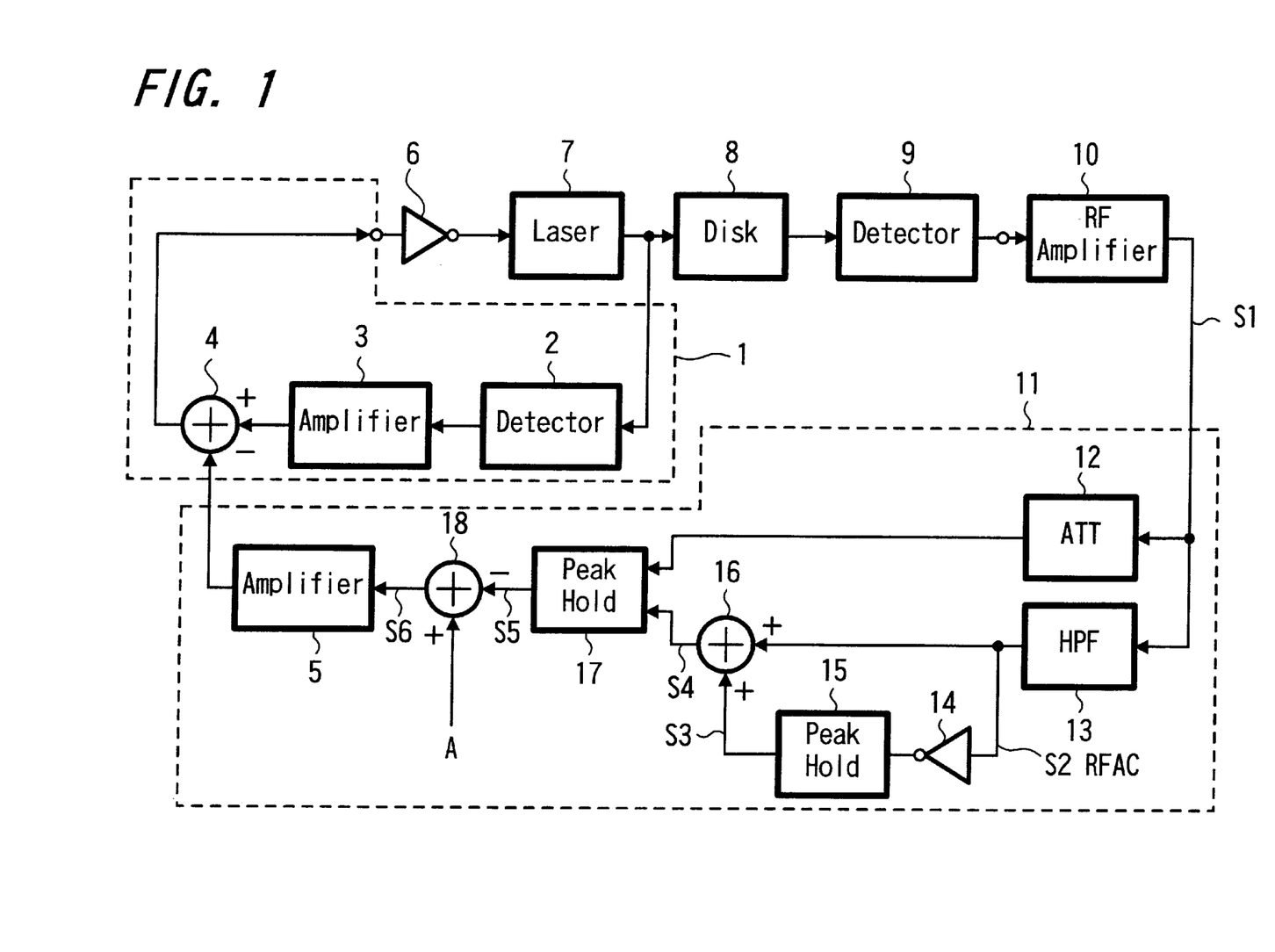
FIG. 1 is a block diagram showing the laser power control circuit of the optical disk device according to an embodiment of the present invention.

FIG. 1 is a block diagram showing a configuration of the laser power control circuit of the optical disk device according to an embodiment of the present invention, which will be described below in detail. Further, in the configuration of the laser power control circuit of the optical disk device shown in FIG. 1, parts corresponding to those of the laser power control circuit of the conventional optical disk device shown in FIG. 5 are denoted by the same reference numerals to omit its description.

FIG. 1 is a block diagram showing a laser power control circuit for an optical disk device according to an embodiment of the present invention. An optical disk device to which the laser power control circuit is applied comprises an automatic power control (APC) circuit 1, an invertor 6, a laser 7 for emitting a laser light, a disk 8 which is irradiated with the laser light, a detector 9 for detecting the reflected light of the laser light irradiated on the disk 8, an RF amplifier 10 for amplifying a reproduced signal detected by the detector 9 and a laser power control (LPC) circuit 11 for detecting an operation signal of the laser power.

The APC circuit 1 includes a detector 2 for monitoring the irradiating light of laser 7, an amplifier 3 for amplifying the monitored level by the detector 2 and an adder 4 for adding the monitored level amplified by the amplifier 3 input to the adding input terminal (+) and the operating signal detected by the LPC circuit 11 input to the subtracting input terminal (−).

The LPC circuit 11 includes an attenuator (ATT) 12 for attenuating a reproduced RF signal S1 amplified by the RF amplifier 10 by a predetermined level, a high pass filter (HPF) 13 for cutting off a DC (direct current component) of the reproduced RF signal S1 to pass the high frequency component, an invertor 14 for inverting an output RFAC (S2) of HPF 13, an peak hold circuit 15 for detecting a peak value S3 of the inverted output of HPF 13 to hold it, an adder 16 for adding the output S2 of HPF 13 and a peak value S3 of the inverted output of HPF 13, a peak hold circuit 17 for detecting and holding a peak value S5 of the ATT 12 and an added output S4, an adder 18 for adding the output of peak hold circuit 17 input to a subtracting input terminal (−) and a target level A input to an adding input terminal (+) to output an operating signal S6, and an amplifier 5 for amplifying an output of the adder 18.

The laser power control circuit 11 has a function to produce a control amount S4 for controlling power of the laser light to be an optimum value in reproduction, that is, a function to make the control amount S4 to be a value based on the amplitude level of information signal upon reproduction and to output the difference from the target level value as the operating signal S6.

The laser power control circuit 11 has also a function to output the difference from the target level value as the operating signal S6 so that the value based on the amplitude level of information signal may become a value of the amplitude level of reproduced high frequency signal or the DC signal proportional to the amplitude level of reproduced high frequency signal.

The laser power control circuit 11 has a function to detect the peak value S3 of bottom level VP− of the reproduced high frequency signal by peak hold, add the bottom peak value S3 detected by the peak hold and the reproduced high frequency signal S1, peak-hold the added output signal S4, and output the difference from the target level value A as the operating signal S6 so as to detect the reproduced high frequency signal or the DC signal proportional to the reproduced high frequency signal.

The laser power control circuit 11 has also a function to shift the information signal upon reproduction by the amplitude VP− and produce a waveform having the maximum amplitude VP−P from zero level. The laser power control circuit 11 compares the peak value of the maximum amplitude VP−P with the amplitude target level A of the information signal upon reproduction and outputs its difference as the operating signal S6 which is supplied to the amplifier 5 to be amplified. This is applied to the laser 7 as the amount of operation for controlling the laser power.

The adder 16 in the laser power control circuit 11 forms an peak-hold means for peak-holding the peak value S3 of the bottom level VP− of reproduced high frequency signal S1 and an adding means for adding the bottom peak value S3 derived by the peak-hold and the reproduced high frequency signal S1. The peak-hold circuit 17 forms an peak-hold means for peak-holding the added output signal S4.

The thus configured laser power control circuit of the optical disk device according to the present embodiment operates as follows.

The reproduced RF signal detected by the detector 9 is supplied to the RF amplifier 10 which amplifies the reproduced RF signal. The RF signal S1 is supplied to the ATT 12 and the HPF 13 of the LPC circuit 11.

The RF signal S1 is attenuated by a predetermined level in the ATT 12 of the LPC circuit 11. The DC (direct current component) of RF signal S1 is cut off in the HPF 13 to pass its high frequency component.

The high frequency output RFAC (S2) of HPF 13 is inverted by the invertor 14 and then supplied to the peak hold circuit 15. The peak hold circuit 15 holds and outputs the peak value S3 of the inverted output of high frequency output RFAC (S2) of HPF 13. The high frequency output S2 of HPF 13 and the peak value S3 of the inverted output of S2 from the peak hold circuit 15 are supplied to the adding input terminals (+) of the adder 16. The adder 16 adds the high frequency output S2 of HPF 13 and the peak value S3 from peak circuit 15 of the inverted output of S2 to output the added output S4 (the control amount). The attenuated output of ATT 12 and the added output S4 are supplied to the peak hold circuit 17.

The peak hold circuit 17 holds and outputs the peak value of an added version of the attenuated output of ATT 12 and the high frequency output of HPF 13. The peak output S5 of peak hold circuit 17 is supplied to the subtracting input terminal (−) of the adder 18. The target level value A is supplied to the adding input terminal (+) of adder 18. The adder 18 adds the peak output S5 and the target level value A to output its difference as the operating signal S6.

The operating signal S6 is supplied to the amplifier 5 to be amplified and then supplied to the subtracting input terminal (−) of the adder 4 in the APC circuit 1. The irradiating light of laser 7 is incident on the detector 2 in the APC circuit 1 and the detector 2 monitors the irradiating light of laser 7. The monitored voltage by the detector 2 is supplied to the amplifier 3 to be amplified. The monitored voltage amplified by amplifier 3 is supplied to the adding input terminal (+) of adder 4. The adder 4 adds the operating signal S6 detected by LPC circuit 11 and the monitored voltage to output its added result. The controlling output (the operation amount) of APC circuit 1 is supplied to the invertor 6 and then to the laser 7 after being inverted. The laser 7 emits the laser light based on the inverted controlling output. The laser light is irradiated on the surface of disk 8 and the reflected light is detected by the detector 9, thereby enabling the information signal to be reproduced.

Figure 2:
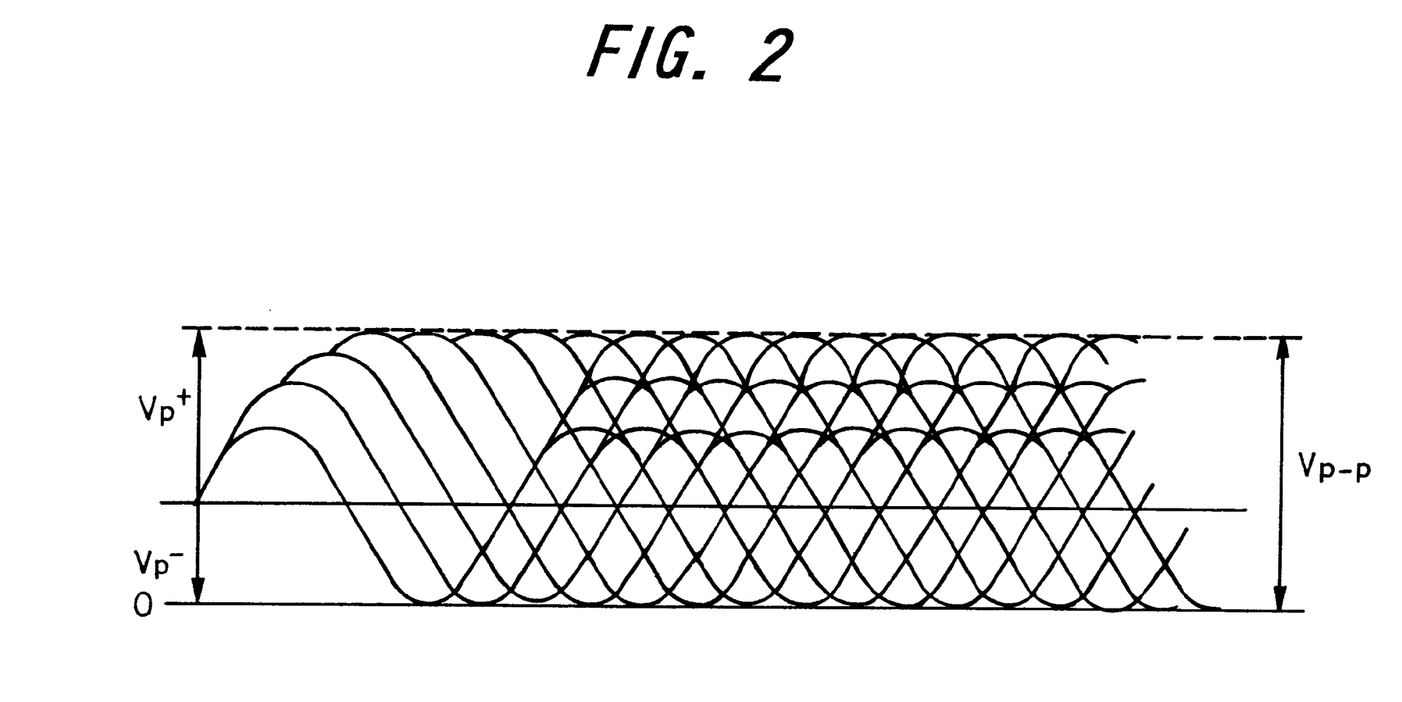
FIG. 2 is a diagram showing a signal waveform of the laser power control circuit according to the embodiment of the present invention.

In this case, the RF signal S1 from RF amplifier 10 is caused to pass the HPF 13 which cuts off the DC (direct current component) of RF signal S1 and the high frequency output RFAC (S2) of HPF 13 is inverted. The peak value S3 of the inverted output of high frequency output RFAC (S2) from HPF 13 is peak-held and this peak value S3 of RFAC (S2) is added to the high frequency output RFAC (S2) of HPF 13. The added output S4 forms the waveform having the maximum amplitude VP−P from zero level as shown in FIG. 2 because the RFAC shown in FIG. 7 is DC-shifted by an amount for the amplitude VP−in the positive direction. The peak value S5 resulting from peak-holding the added output S4 forms the value of VP−P. The peak value S5 is used as a main feedback value and compared with the amplitude target value A of RF signal. The difference between them is impressed on the APC circuit 1 to control the laser power.

In this way, the level of laser power is restricted to the RF signal level established by the target level A. Besides, the attenuated output of ATT 12 is peak-held to be used for detecting the amount of control S4. This is on purpose to ensure the level of RF signal S1 by detecting the operating signal S6 from the LPC circuit 11, even if the recording or reproduction of the information signal is performed on the disk 8 e.g. having very low degree of modulation.

Thus, by making the amplitude VP−P of RF signal to be the control amount S4 for laser power control, it will be possible to always obtain the constant amplitude of RF signal, even if there is the unevenness of asymmetry. In addition, because the amplitude of RF signal can always be detected, it will be possible to restrain the variation of laser power during the movement of optical pickup such as the track jump and so on.

Figure 3:
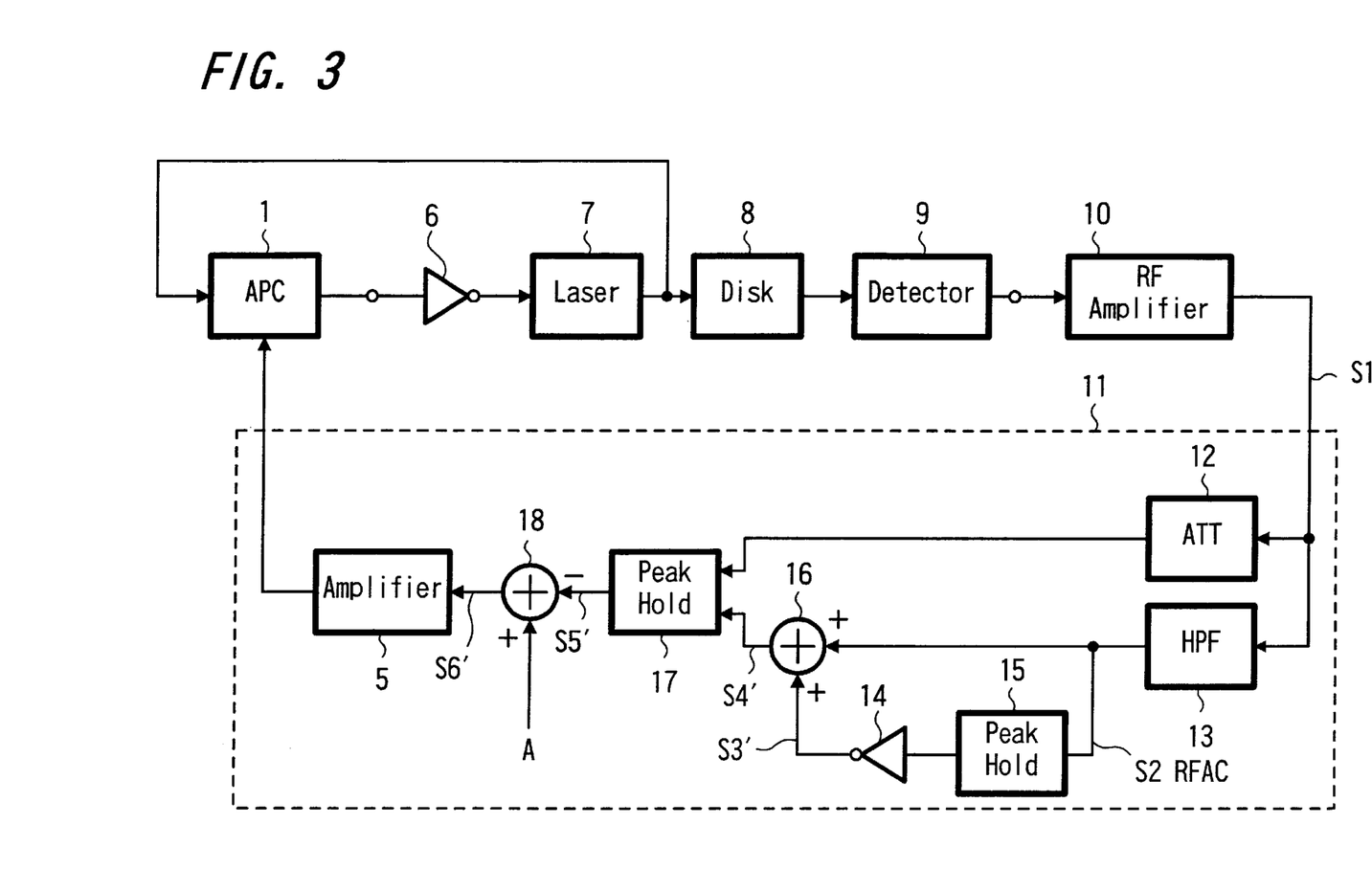
FIG. 3 is a block diagram showing another laser power control circuit of the optical disk device according to the embodiment of the present invention.

FIG. 3 is a block diagram showing a configuration of another laser power control circuit of an optical disk device according to the embodiment of the present invention. Further, in the configuration of the laser power control circuit of an optical disk device shown in FIG. 3, corresponding parts to those of the laser power control circuit shown in FIG. 1 are denoted by the same reference numerals to omit its description. The other laser power control circuit of the optical disk device shown in FIG. 3 is an improved version of the laser power circuit. The only different points from the configuration shown in FIG. 1 are described below.

The LPC circuit 11 comprises the attenuator (ATT) 12 for attenuating by the predetermined level the reproduced RF signal S1 amplified by RF amplifier 10, the high pass filter (HPF) 13 for cutting off the DC (direct current component) of reproduced RF signal S1 to pass its high frequency component, the peak hold circuit 15 for detecting and holding the peak value of output RFAC S2 of HPF 13, the invertor 14 for inverting the peak value to output an inverted output S3', the adder 16 for adding the output S2 of HPF 13 and the inverted output S3' of peak value of the output from HPF 13, the peak hold circuit 17 for detecting and holding a peak value S5' of the output of ATT 12 plus the added output S4', the adder 18 for adding the output S5' of peak hold circuit 17 input to the subtracting input terminal (−) and the target level A input to the adding input terminal (+) to output an operating signal S6', and the amplifier 5 for amplifying the output of adder 18.

The thus configured laser power control circuit of optical disk device according to the present embodiment operates as follows.

The RF signal S1 is attenuated by the predetermined level in the ATT 12 of LPC circuit 11. The DC (direct current component) of RF signal S1 is cut off in the HPF 13 to pass its high frequency component.

The high frequency output RFAC S2 of HPF 13 is supplied to the peak hold circuit 15, which holds the peak value of high frequency output RFAC S2 of HPF 13. The invertor 14 inverts that peak value to output the inverted output S3'. The high frequency output S2 from HPF 13 and the inverted output S3' of the peak value of S2 from peak hold circuit 15 are supplied to the respective adding input terminals (+) of adder 16. The adder 16 adds the high frequency output S2 of HPF 13 and the inverted output S3' of the peak value of S2 from peak hold circuit 15 to output the added output S4' (the control amount). The attenuated output of ATT 12 and the added output S4' are both supplied to the peak hold circuit 17.

The peak hold circuit 17 holds the peak value S5' of an added version of the attenuated output of ATT 12 and the high frequency output of HPF 13 for outputting. The peak output S5' of peak hold circuit 17 is supplied to the subtracting input terminal (−) of adder 18. The target level value A is supplied to the adding input terminal (+) of adder 18. The adder 18 compares the peak output S5' with the target level value A to output its difference as the operating signal S6'.

In this case, the RF signal S1 from RF amplifier 10 is made to pass the HPF 13 and the peak value of the high frequency output RFAC (S2) of HPF 13 which cuts off the DC (direct current component) of RF signal S1 is peak-held to add the inverted output S3' obtained by inverting the peak value of RFAC (S2) and the high frequency output RFAC (S2) of HPF 13. The added output S4' forms the waveform having the maximum amplitude VP−P from zero level as shown in FIG. 2, because the RFAC shown in FIG. 7 is DC-shifted by an amount for the amplitude VP− in the positive direction in the same manner as S4. The peak value S5' obtained by peak-holding the added output S4' becomes the value of VP−P. The peak value S5' is used as the main feedback value and compared with the amplitude target value A of RF signal. The difference between them is impressed on the APC circuit 1 as the operating signal S6' to control the laser power.

This causes the level of laser power to be restricted to the RF signal level established by the target level A.

Thus, by making the amplitude VP−P of RF signal to be the control amount S4' for laser power control, it will be possible to always obtain the constant amplitude of RF signal, even if there is the irregularity of asymmetry. In addition,because the amplitude of RF signal can always be detected, it will be possible to restrain the variation of laser power during the movement of optical pickup such as the track jump or the like.

Figure 4:
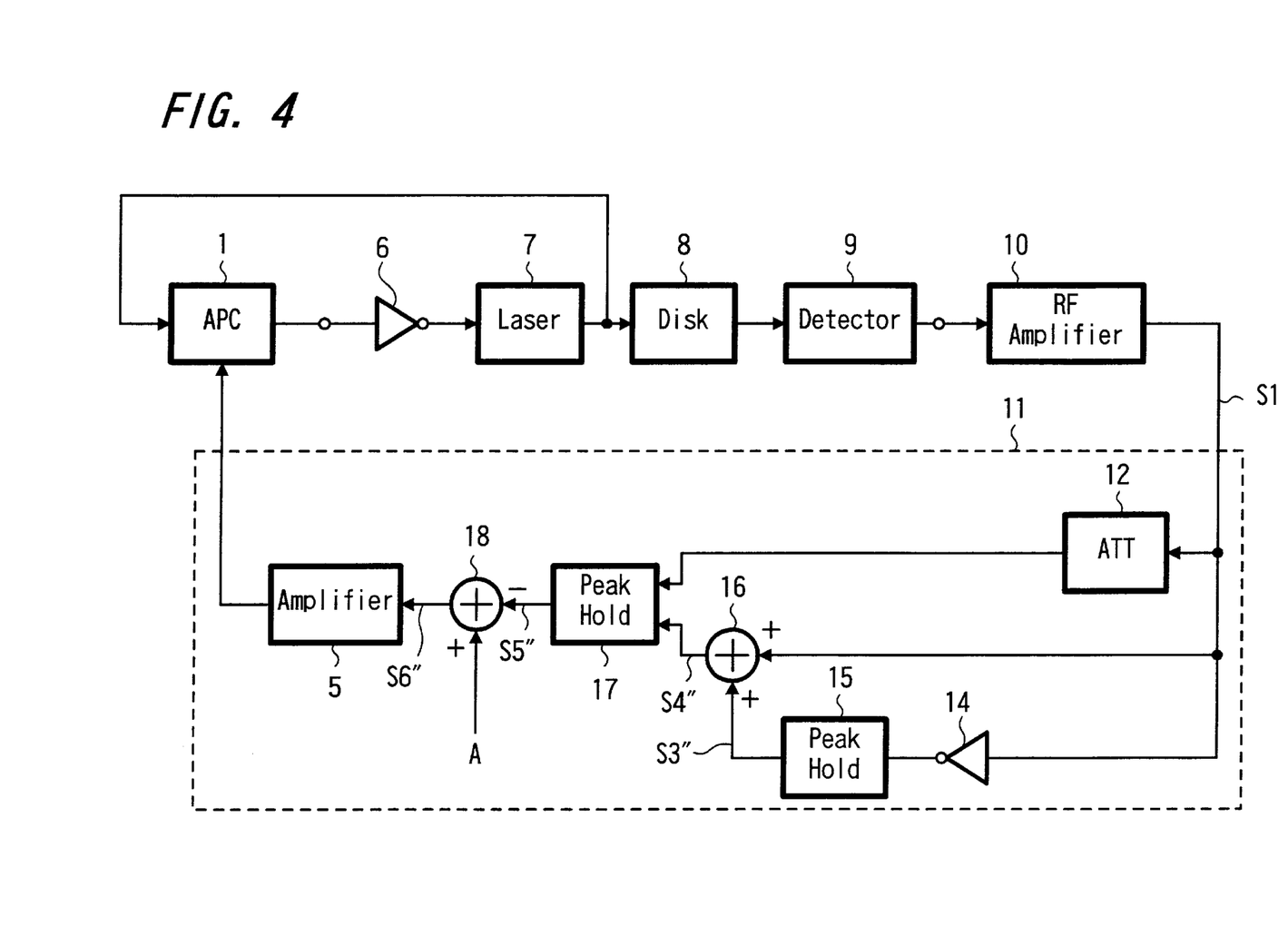
FIG. 4 is a block diagram showing a still another laser power control circuit of the optical disk device according to the embodiment of the present invention.

FIG. 4 is a block diagram showing a configuration of still another laser power control circuit of optical disk device according to the embodiment of the present invention. Further, in the configuration of still another laser power control circuit of optical disk device shown in FIG. 4, corresponding parts to those of the laser power control circuit shown in FIG. 1 are denoted by the same reference numerals to omit its description. The still another laser power control circuit of optical disk device shown in FIG. 4 is an improved version of the laser power control circuit. The only different points from the configuration shown in FIG. 1 are described below.

The LPC circuit 11 comprises the attenuator (ATT) 12 for attenuating the reproduced RF signal S1 amplified by RF amplifier 10 by the predetermined level, an invertor 14 for inverting the RF signal S1, a peak hold circuit 15 for detecting and holding a peak value S3" of the inverted output, an adder 16 for adding the RF signal S1 and the peak value S3" of the inverted output, the peak hold circuit 17 for detecting and holding a peak value S5" of the ATT 12 plus the added output S4", the adder 18 for adding the output of peak hold circuit 17 input to the subtracting input terminal (−) and the target level A input to the adding input terminal (+) to output the operating signal S6", and the amplifier 5 for amplifying the output of adder 18.

The thus configured laser power control circuit of optical disk device according to the present embodiment operates as follows.

The RF signal S1 is inverted by the invertor 14 and then supplied to the peak hold circuit 15 which holds the peak value S3" of the inverted output of RF signal S1 for outputting. The RF signal S1 and the peak value S3" from peak hold circuit 15 are supplied to the respective adding input terminals (+) of adder 16. The adder 16 adds the RF signal S1 and the peak value S3" from peak hold circuit 15 to output the added output S4" (the control amount). The attenuated output of ATT 12 and the added output S4" are both supplied to the peak hold circuit 17.

The peak hold circuit 17 holds the peak value S5" of an added version of the attenuated output of ATT 12 and the added output S4" for outputting. The peak output S5" of peak hold circuit 17 is supplied to the subtracting input terminal (−) of adder 18. The target level value A is supplied to the adding input terminal (+) of adder 18. The adder 18 adds the peak output S5" and the target level value A to output its difference as the operating signal S6".

In this case, the RF signal SI from RF amplifier is inverted and the peak value S3" of the inverted output of RF signal S1 is peak-held to add the peak value S3" of the inverted output of RF signal S1 and the RF signal S1. The added output S4" becomes a waveform in which the DC component to be cut off by HPF 13 is added to S4 and the RFAC shown in FIG. 7 is DC-shifted by an amount for the amplitude VP− in the positive direction. Thus, the waveform has the maximum amplitude VP–P from zero level as shown in FIG. 2. The peak value S5" obtained by peak-holding the added output S4" becomes the value VP–P. The peak value S5" is made the main feedback value and compared with the amplitude target value A of RF signal. The difference between them is applied to the APC circuit 1 as the operating signal S6" to control the laser power.

This causes the level of laser power to be restricted to the RF signal level established by the target level A.

In this way, by using the amplitude VP–P of RF signal as the control amount S4" for the laser power control, it will be possible to always obtain the constant amplitude of RF signal, even if there is the unevenness of asymmetry. In addition, because the amplitude of RF signal can always be detected, it will be possible to restrain the variation of laser power during the movement of optical pickup such as the track jump and so on.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical information apparatus for reproducing an information signal recorded on an optical recording medium by irradiating a laser light modulated by the information signal on the optical information recording medium to obtain a reproduced signal, comprising:

a laser power control circuit, including means for controlling power of said laser light to an optimum value during reproduction to a value based on a swing amplitude level from bottom to top of said information signal upon reproduction, said laser power control circuit including means for outputting a difference between said amplitude swing level from bottom to top of the information signal upon reproduction and a target level value as an operating signal that controls the laser light.

2. An optical information reproducing apparatus according to claim 1, wherein said value based on the swing amplitude level from bottom to top of said information signal is a value of the swing amplitude level from bottom to top of said reproduced signal or a DC signal proportional to the swing amplitude level from bottom to top of said reproduced signal.

3. An optical information apparatus for reproducing an information signal recorded on an optical recording medium by irradiating a laser light modulated by an information signal on the optical information recording medium to obtain a reproduced signal, comprising a laser power control circuit controlling power of said laser light to an optimum value during reproduction to a value based on a swing amplitude level from bottom to top of said information signal upon reproduction wherein said laser power control circuit comprises a peak-hold means for detecting and holding a peak amplitude value at a bottom level of said reproduced signal, an adding means for adding the peak amplitude value at a bottom level detected by said peak-hold means and said reproduced information signal, said peak-hold means holding an added out-put signal by said adding means, thereby making a DC signal proportional to the swing amplitude level from bottom to top of said reproduced signal to be detected.

4. An optical information reproducing method for reproducing an information signal recorded on an optical recording medium by irradiating a laser light modulated by an information signal on the optical information recording medium to obtain a reproduced signal, comprising the steps of, during reproduction, controlling power of said laser light to a value based on a swing amplitude level from bottom to top of said information signal upon reproduction, and outputting a difference between a swing amplitude level from bottom to top of said information signal upon reproduction and a target level value as an operating signal that controls the laser light.

5. An optical information reproducing method according to claim 4, wherein said value based on said swing amplitude level from bottom to top of said information signal is a value of said swing amplitude level from bottom to top of a reproduced signal or a DC signal proportional to said swing amplitude level from bottom to top of said reproduced signal.

6. An optical information reproducing apparatus according to claim 4, wherein said value based on the swing amplitude level from bottom to top of said information signal is a value of the swing amplitude level from bottom to top of said reproduced signal or a DC signal proportional to the swing level from bottom to top of said reproduced signal.

7. An optical information reproducing method for reproducing a high frequency information signal recorded on an optical recording medium by irradiating a laser light modulated by an information signal on the optical information recording medium to obtain a reproduced signal, comprising the steps of: during reproduction, controlling power of said laser light to an optimum value during reproduction to a value based on the swing amplitude level from bottom to top of said information signal upon reproduction, detecting a peak amplitude value at a bottom level of said reproduced signal by holding its peak value, adding a bottom peak value detected by holding its peak and said reproduced signal, and holding a peak of said added output signal, thereby making a DC signal proportional to the swing level from bottom to top of said reproduced signal to be detected.

8. An optical information reproducing method according to claim 7, wherein said value based on said swing amplitude level from bottom to top of said information signal is a value of said swing level from bottom to top of a reproduced signal or a DC signal proportional to said swing level from bottom to top of said reproduced signal.

* * * * *